United States Patent [19]

Ozawa et al.

[11] Patent Number: 4,492,366
[45] Date of Patent: Jan. 8, 1985

[54] ELASTICALLY DAMPING DEVICE FOR THE SUSPENSION OF AN ENGINE

[75] Inventors: Isao Ozawa; Yukio Aono, both of Inazawa; Masato Ueno, Komaki, all of Japan

[73] Assignee: Toyoda Gosei Co., Ltd., Nishikasugai, Japan

[21] Appl. No.: 427,533

[22] Filed: Sep. 29, 1982

[30] Foreign Application Priority Data

| Sep. 30, 1981 | [JP] | Japan | 56-156031 |
| Oct. 9, 1981 | [JP] | Japan | 56-161878 |
| Dec. 24, 1981 | [JP] | Japan | 56-213604 |
| Dec. 25, 1981 | [JP] | Japan | 56-198200[U] |
| Dec. 29, 1981 | [JP] | Japan | 56-215872 |
| Dec. 29, 1981 | [JP] | Japan | 56-198337[U] |

[51] Int. Cl.³ .................. F16M 5/00; B60G 11/62
[52] U.S. Cl. .................. 267/140.1; 180/312; 248/562; 248/636; 248/659; 267/35; 267/141.3
[58] Field of Search .......... 267/8 R, 35, 63 R, 140.1, 267/141.1, 141.2, 141.4, 141.3, 141.7, 152, 153, 141.5, 141.6, 113; 188/298; 248/562, 615, 631, 635, 636, 659; 180/312

[56] References Cited

U.S. PATENT DOCUMENTS

| 4,159,091 | 6/1979 | Le Salver et al. | 267/140.1 |
| 4,161,304 | 7/1979 | Brenner et al. | 267/35 |
| 4,288,063 | 9/1981 | Brenner et al. | 267/8 R |
| 4,424,960 | 1/1984 | Dan et al. | 267/140.1 |

FOREIGN PATENT DOCUMENTS

| 2639452 | 3/1978 | Fed. Rep. of Germany | 267/35 |
| 1149790 | 12/1957 | France | 267/141.3 |
| 109840 | 8/1980 | Japan | 267/140.1 |
| 149436 | 11/1980 | Japan | 267/140.1 |

Primary Examiner—Duane A. Reger
Assistant Examiner—Robert J. Oberleitner
Attorney, Agent, or Firm—Cushman, Darby & Cushman

[57] ABSTRACT

An elastically damping device for the suspension of an engine comprises a conical first fluid chamber which is formed in the bottom portion of a frustoconical elastically deformable block, and a second fluid chamber which is formed on the upper surface of the block by fixing the open end of an elastically deformable thin sheet thereto. The top portion of the first fluid chamber and the second fluid chamber are interconnected to each other by way of an open passageway which is formed in the block. The first fluid chamber, the second fluid chamber and the open passageway are filled with a liquid. This device is supported on a body of a vehicle by a first supporting plate which is connected to the under surface of the block and the engine is mounted on the block by a second supporting plate which is connected to the upper surface of the block.

10 Claims, 10 Drawing Figures

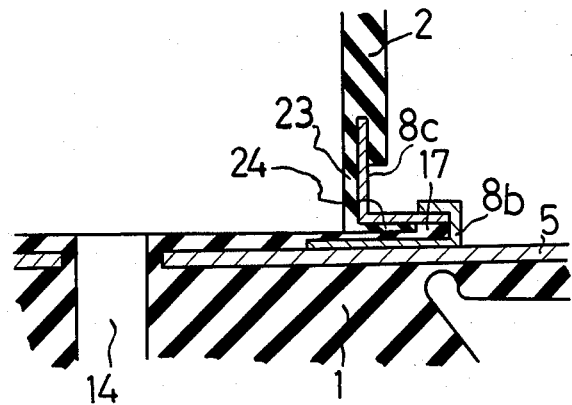
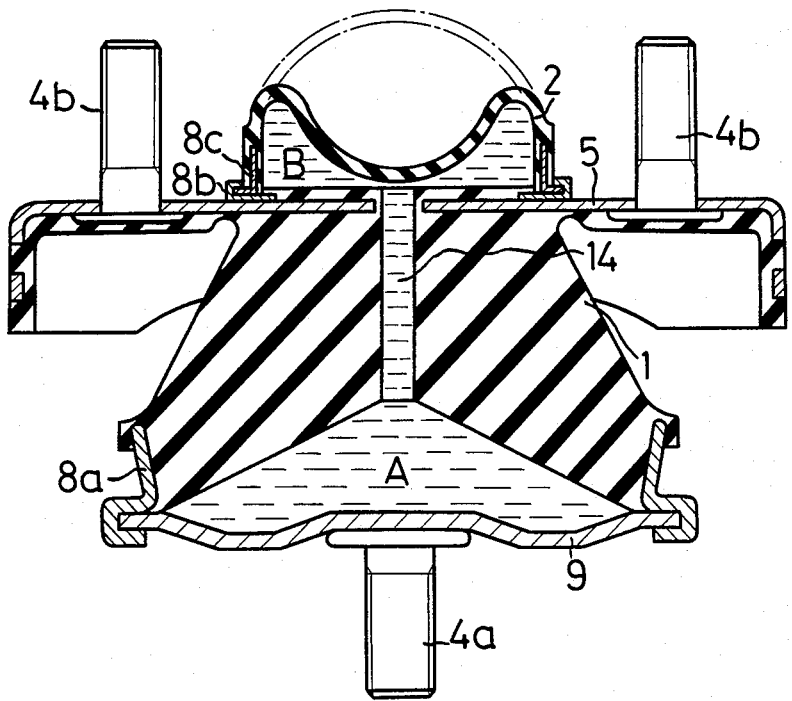

ELASTICALLY DAMPING DEVICE FOR THE SUSPENSION OF AN ENGINE

BACKGROUND OF THE INVENTION

The present invention relates to an elastically damping device, particularly to a damping device which is applied to an engine mount for damping the vibration of the engine of a vehicle.

The elastically damping device generally comprises a first fluid chamber defined by a thick wall made of elastically deformable material, a second fluid chamber defined by a relatively thin wall made of elastically deformable material, a partition wall which separates the first fluid chamber and the second fluid chamber and an orifice which is formed in the partition wall so as to interconnect the first fluid chamber and the second fluid chamber. The damping device having the above structure is mounted on a body of a vehicle in the wall defining the first fluid chamber while supporting an engine.

The damping device of this type is required to be formed into a small size and a simple structure and to have an excellent vibration damping operation.

And the damping device is also required to have such a vibration damping effect as to increase in accordance with the increment of the amplitude of vibration.

Conventionally, a metallic plate provided with an orifice having a small diameter has been employed as the partition wall of the damping device.

However, the length of the flowing route of the orifice is small so that the flowing resistance generating in the orifice when the liquid passes the orifice is small. Therefore, sufficiently excellent damping effect cannot be obtained.

And the vibration damping effect does not increase in accordance with the increment of the amplitude of vibration.

In order to increase the flowing resistance of the orifice, it has been proposed to make the metallic partition wall thick and to make the length of the flowing route of the orifice large by forming the orifice into a spiral shape.

However, in the damping device having such a structure, as the thickness of the partition wall increases, the weight of the device also increases and the spiral orifice cannot be easily formed.

Furthermore, another damping device has been proposed in order to increase the flowing resistance of the orifice. In this damping device, the second fluid chamber is formed so as to arround the first fluid chamber, and the fluid chambers are separated from each other by a thick wall. An orifice is formed in the thick wall so as to extend in the lateral direction therethrough.

This device has a defect that the size thereof is large in the lateral direction.

In addition, this device has another defect that into the liquid filling the first and the second fluid chambers, air inevitably intermixes.

When the air having compressibility is mixed with the liquid filling the fluid chambers, particularly the first fluid chamber, the vibration damping effect of the device lowers.

Therefore, it is desirable that the air within the first fluid chamber easily moves into the second fluid chamber.

In the conventional device, the orifice is formed in the lateral direction of the device so that the air does not easily escape into the second fluid chamber.

Accordingly, one object of the present invention is to provide a simple and small sized elastically damping device having an excellent vibration damping effect.

Another object of the present invention is to provide an elastically damping device of which damping effect increases in accordance with the increment of the amplitude of vibration.

A still another object of the present invention is to provide an elastically damping device having such a construction that the air within the liquid easily gathers into the second fluid chamber.

A further object of the present invention is to provide an elastically damping device having excellent durability.

A still further object of the present invention is to provide an elastically damping device which can be easily assembled.

DESCRIPTION OF THE DRAWINGS

Other objects and advantages of the invention will become apparent from the following description of embodiments thereof with reference to the accompanying drawings wherein:

FIG. 1 is a plane view of the first embodiment;

FIG. 2 is a longitudinal sectional view taken along the line II—II of FIG. 1;

FIG. 5 is a plane view of the fourth embodiment;

FIG. 6 is a longitudinal sectional view taken along the line VI—VI of FIG. 5;

FIG. 7 is a longitudinal sectional view taken along the line VII—VII of FIG. 5, wherein on the damping device, the engine is mounted;

FIG. 8 is a partial longitudinal sectional view of a fifth embodiment;

FIGS. 9 and 10 illustrate a sixth embodiment of the present invention;

FIG. 9 is a longitudinal sectional view of the sixth embodiment; and

FIG. 10 is a longitudinal sectional view of the sixth embodiment of the damping device, which is fixed to the body of a vehicle while supporting the engine.

SUMMARY OF THE INVENTION

The elastically damping device of the present invention has an elastically deformable block which deforms a first fluid chamber. The block has a frustoconical shape and is provided with a conical cavity in the bottom portion thereof. And the block is further provided with an open passageway which extends from the top portion of the cavity to the center of the upper surface of the block.

A first supporting plate having a hole of which shape and size are equal to those of the opening of the cavity, is fixed to the under surface of the block so that the hole is opposed to the opening of the cavity. And a second supporting plate having a small hole of which shape and size are equal to those of the open passageway of the block is fixed to the upper surface of the block so that the small hole is opposed to the open passageway.

To the upper surface of the second supporting plate, the opening end of an elastically deformable thin sheet is fixed around the orifice formed in the second supporting plate to form a second fluid chamber between the thin sheet and the second supporting plate.

The opening of the cavity of the first fluid chamber is closed by a bottom plate.

The first fluid chamber and the second fluid chamber which are interconnected by the open passageway, are filled with a fluid.

The elastically damping device having the above described construction is supported by a body of a vehicle through the first supporting plate and an engine of the vehicle is mounted on the second supporting plate.

When the engine vibrates, the vibration is transmitted to the thick wall to deform the block. Due to the deformation of the block, the volume of the first fluid chamber changes so that the fluid moves from the first fluid chamber to the second fluid chamber or inversely by way of the open passageway.

According to the present invention, the open passageway is formed in the block so that the length of the flowing route of the passageway can be made large. Therefore, a large flowing resistance, and accordingly a large vibration damping effect can be obtained.

When the amplitude of vibration increases, the block is further deformed into a crushed shape, and the diameter of the open passageway is decreased. As a result, the flowing resistance of the passageway increases and accordingly, the vibration damping effect also increases.

In the damping device of the present invention, the first fluid chamber has a conical shape of which outer periphery is tapered, and from the top portion of the first fluid chamber, the open passageway is formed in the thick wall in the vertical direction.

Therefore, the air intermingled with the fluid filling the first fluid chamber can easily move into the second fluid chamber through the open passageway.

Furthermore, the shape and structure of each component part of the damping device of the present invention is simple and the durability thereof is also excellent.

DETAILED DESCRIPTION OF THE INVENTION

Figure 1:
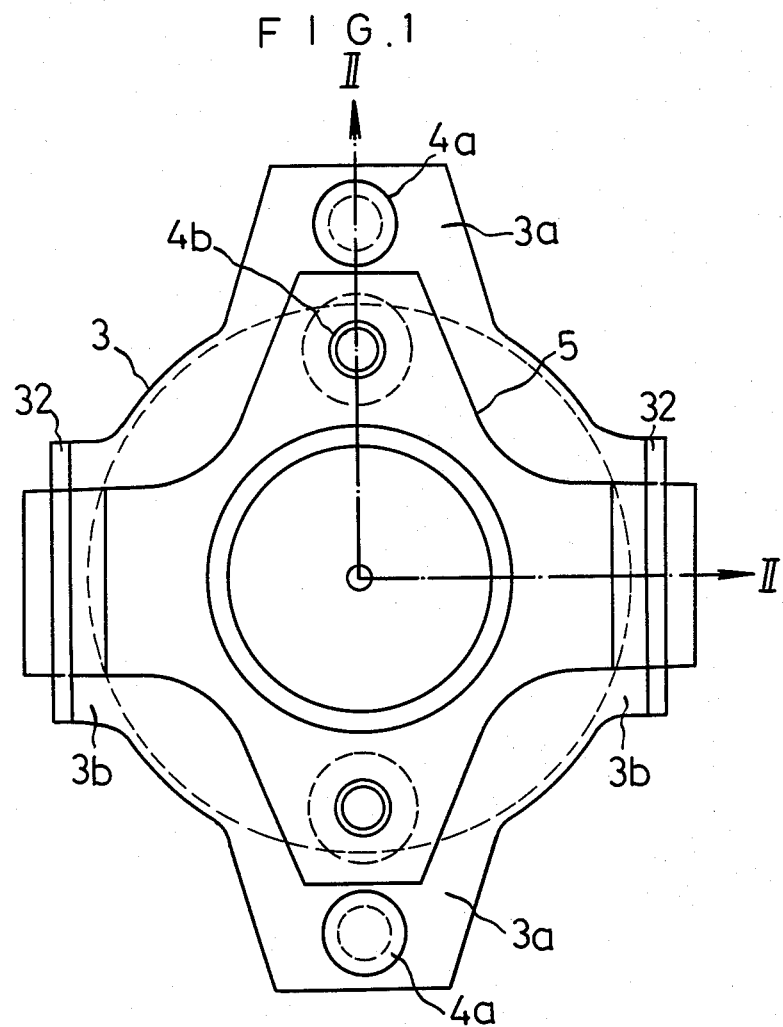
FIGS. 1 and 2 illustrate a first embodiment of an elastically damping device for the suspension of an engine according to the present invention.
Figure 2:
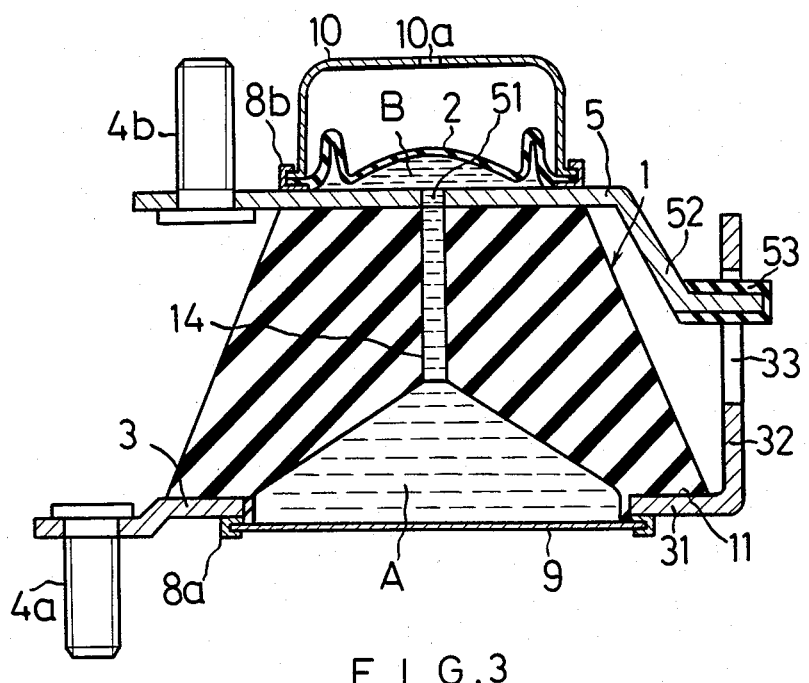

FIGS. 1 and 2 illustrate a first embodiment of the present invention.

A first fluid chamber A is defined by an elastically yieldable thick wall 1. The wall 1 is provided with a tapered outer peripheral surface, a first end surface 11 having a larger diameter and a second end surface 12 having a smaller diameter. The first end surface 11 is parallel with the second end surface 12. In the first end surface 11, a conical cavity 13 is formed. The wall thickness of the wal 11 is made larger on the side of the second end surface 12.

Between the top portion of the cavity 13 and the center of the second end surface 12, an open passageway 14 is formed so as to penetrate the wall 1.

To the first end surface 11, an annular portion 31 of a first supporting plate 3 is secured.

In the annular portion 31, projecting portions 3a are formed so as to be opposed to each other in the radial direction of the plate 3 and bolts 4a project therefrom downwards.

In the annular portion 31, another projecting portions 3b are formed between the projecting portions 3a.

Each projecting portion 3b is bent at a substantially right angle and extends upwards to form a vertical portion 32.

In the upper part of each vertical portion 32, a window like through hole 33 is formed.

To the second end surface 12, a second supporting plate 5 is secured. In the second supporting plate 5, an opening 51 is formed. The opening 51 is communicated with the open passageway 14. Two bolts 4b project from the second supporting plate 5 upwards.

In both sides of the second supporting plate 5 projecting portions 52 are formed. Each projecting portion 52 first extends from each side of the second supporting plate 5 downwards in the oblique direction and next is bent in the horizontal direction.

The horizontally bent portion of the projecting portion 52 is covered by a cover 53 made of rubber and inserted into the through hole 33 of the first supporting plate 3.

The wall 1, the first and the second supporting plates 3 and 5 and the rubber cover 53 are formed in advance so as to have a united structure. Namely, at first, a mould provided with cavities which correspond to the wall 1 and the rubber cover 53 is prepared and the first and the second supporting plates 3, 5 are set in the above mould. Hereafter, rubber material is poured into the cavities.

To the first supporting plate 3, an annular caulking metallic ring 8a is fixed along the opening of the annular portion 31. And to the second supporting plate 5, an annular caulking metallic ring 8b is fixed.

Then, the obtained body having an integral structure is immersed into a liquid bath. Within the liquid, a bottom plate 9 is fixed to the annular portion 31 liquidtightly by means of the caulking ring 8a for covering the opening of the cavity 12. As a result, a first fluid chamber A is formed.

To the second supporting plate 5, the outer peripheral edge of an elastically yieldable thin sheet 2 and the opening edge of a cup-shaped cover member 10 are fixed by means of the caulking ring 8b. The thin sheet 2 is in the loose state. Between the sheet 2 and the second supporting plate 5, a second fluid chamber B filled with a liquid, is formed.

The first fluid chamber A is intercommunicated with the second fluid chamber B by way of the opening 51 and the open passageway 14.

In the cover member 10, a vent hole 10a is formed.

The elastically damping device having the above described structure is mounted on a body of a vehicle and fixed to the body by means of the bolts 4a and nuts (not shown).

On the second supporting plate 5, an engine (not shown) is mounted. The engine is fixed to the plate 5 by means of the bolts 4b and nuts (not shown).

When the vibrations of the engine is transmitted to the elastically damping device for the suspension of the engine, the elastically yieldable wall 1 firstly deforms. And, the volume of the first fluid chamber A changes to occur the difference in liquid pressure in the fist fluid chamber A and the second fluid chamber B.

Consequently, the liquid flows from the chamber A to B or inversely to produce a flowing resistance in the passageway 14. Due to this flowing resistance, the vibration of the engine is damped.

When the amplitude of the vibration of the engine is increased until the deforming value of the wall 1 reaches a predetermined value, the projecting portion 52 which is inserted into the through hole 33 formed in the vertical portion 32 of the first supporting plate 3 is abutted on the bottom of the through hole 33 As a result, the deformation of the wall 1 is stopped.

And the expansion of the second fluid chamber B is restricted to a predetermined value by means of the cover member 10.

As described above, according to the first embodiment of the present invention, the thick wall 1 forms a partition wall which defines the first and the second fluid chambers A, B and the open passageway 14 which interconnects the chambers A and B, is formed in the thick wall 1.

Therefore, the length of the open passageway 14 is large so that the flowing resistance in the passageway 14 can be made large. As a result, the vibration of the engine can be effectively damped.

When the amplitude of the vibration is increased, the wall 1 is crushed and the diameter of the passageway 14 is decreased. As a result, a large flowing resistance can be obtained. Namely, the elastically damping device of the first embodiment exhibits excellent damping effect which corresponds to the increment of the amplitude of the vibration of the engine.

Furthermore, in the device of the first embodiment of the present invention, the stopper means is provided between the first supporting plate 3 and the second supporting plate 5. Therefore, the excessive deformation of the wall 1 can be prevented so that excellent durability of the device can be obtained.

Since the wall 1 provided with the open passageway 14, and the first and the second supporting plates 3, 5 are formed into a united structure, the damping device provided with the first and the second fluid chambers A and B can be formed only by fixing the bottom plate 9, the thin sheet 2 and the cover member 10 to the united structure within the liquid bath.

When the liquid is filled into the first and the second fluid chambers A, B, air is inevitably intermixed with the liquid filling the chambers. Since air has compressibility, the air intermixed with the liquid lowers the vibration damping effect of the device.

In the damping device of the first embodiment, the first fluid chamber A has a conical shape and the open passageway 14 is formed from the top portion of the chamber A in the vertical direction. Therefore, bubbles formed from the air easily move from the first fluid chamber A to the second fluid chamber B. As a result, air scarecely exists within the first fluid chamber A. The vibration damping effect of the device of the present invention does not lower.

Figure 3:
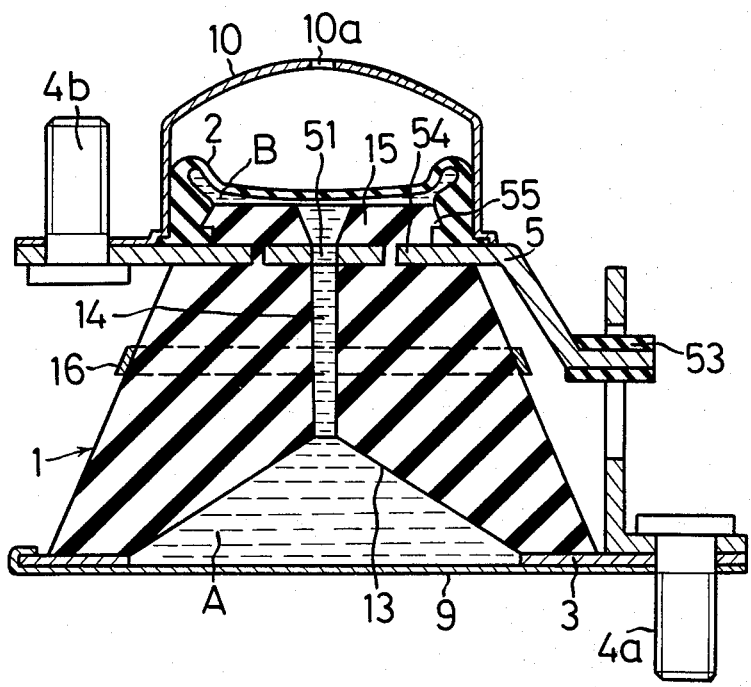
FIG. 3 is a longitudinal sectional view of a second embodiment of the damping device according to the present invention.

FIG. 3 illustrates a second embodiment of the present invention.

In the damping device of the second embodiment, a projecting portion 15 is formed on the upper side of the second supporting plate 5 so as to be united with the wall 1. The projecting portion 15 is connected to the wall 1 through the holes 54 which are formed in the second supporting plate 5 and the projecting portion 15 is provided with an engaging portion 55 in the outer periphery thereof. By means of the engaging portion 55, the elastic thin sheet 2 for forming the second fluid chamber B can be easily engaged with the projecting portion 15.

To the outer periphery of the wall 1, a band member 16 is fixed. The band member 16 restricts the expansion of the wall 1 in the radial direction thereof. As a result, the wall 1 expands and contracts only upwards and downwards so that the volume change of the first fluid chamber A increases when the engine vibrates.

Figure 4:
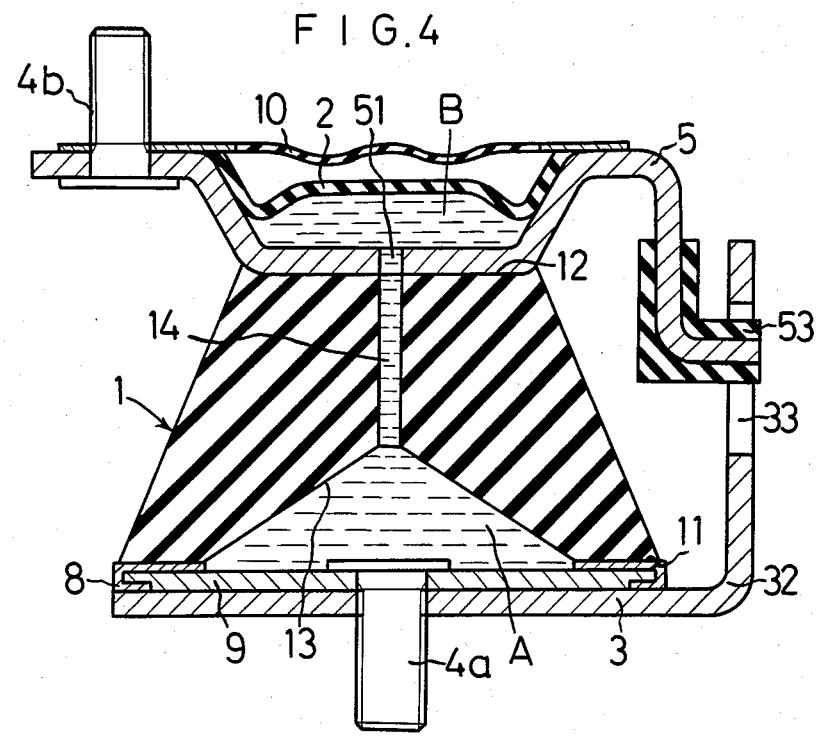
FIG. 4 is a longitudinal sectional view of a third embodiment of the damping device according to the present invention.

FIG. 4 illustrates a third embodiment of the present invention.

In the damping device of the third embodiment, the central portion of the second supporting plate 5 is formed into a frustoconical shape. The under surface of the frustoconical central portion is joined to the second end surface 12 of the elastically yieldable thick wall 1. To the upper surface of the frustoconical central portion, an elastically yieldable thin sheet 2 is joined to form the second fluid chamber B between the second supporting plate 5 and the elastically yieldable thin sheet 2. The sheet 2 is covered by the flexible thin cover member 10.

The bottom plate 9 is fixed to the first end surface 11 of the wall 1 by means of a caulking ring 8 which is previously fixed to the wall 1, to cover the first fluid chamber A. From the central portion of the bottom plate 9, the bolt 4a projects downwards.

The damping device of the third embodiment is easily assembled. Namely, the second supporting plate 5 and the annular caulking ring 8 are set in predetermined positions of the mould. The mould is provided with cavities in such positions as to correspond to the wall 1, the sheet 2 and the rubber cover 53. Into the cavities, rubber material is poured. As a result, a united structure composed of the above members can be obtained.

Next, this united structure is immersed into a liquid bath. The liquid enters from the opening of the cavity 13 and fills the cavity 13, the open passageway 14, the opening 51, and the space formed between the second supporting plate 5 and the sheet 2.

Then, the bottom plate 9 is fixed to the wall 1 by means of the caulking ring 8 to cover the cavity 13 which is filled with the liquid. As a result, the elastically damping device of which the first and the second fluid chambers A, B are filled with the liquid, can be obtained.

This device is placed on the first supporting plate 3 which is disposed on the body of a vehicle. Then, the device is fixed to the body of the vehicle together with the first supporting plate 3 by means of the bolts 4a and nuts (not shown).

Next, on the second supporting plate 5, the cover member 10 is placed so as to cover the opening of the frustoconical central portion of the plate 5. On the cover member 10, an engine is mounted, and the engine is fixed to the elastically damping device by the bolts 4b and nuts (not shown).

As described above, according to the third embodiment of the present invention, the operation of charging the fluid into the damping device can be easily carried out.

Figure 5:
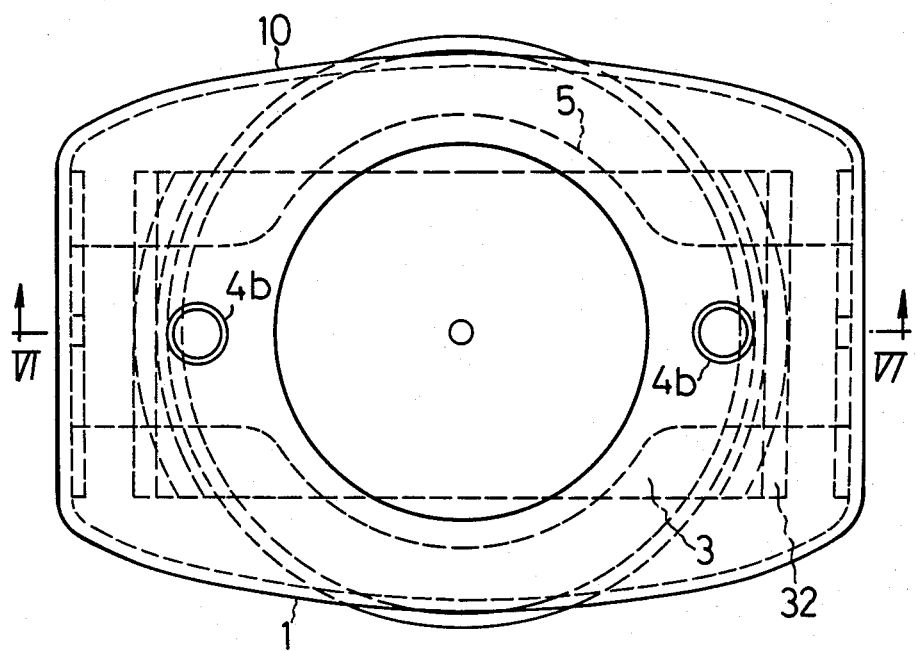
FIGS. 5, 6 and 7 illustrate a fourth embodiment of the damping device according to the present invention.
Figure 6:
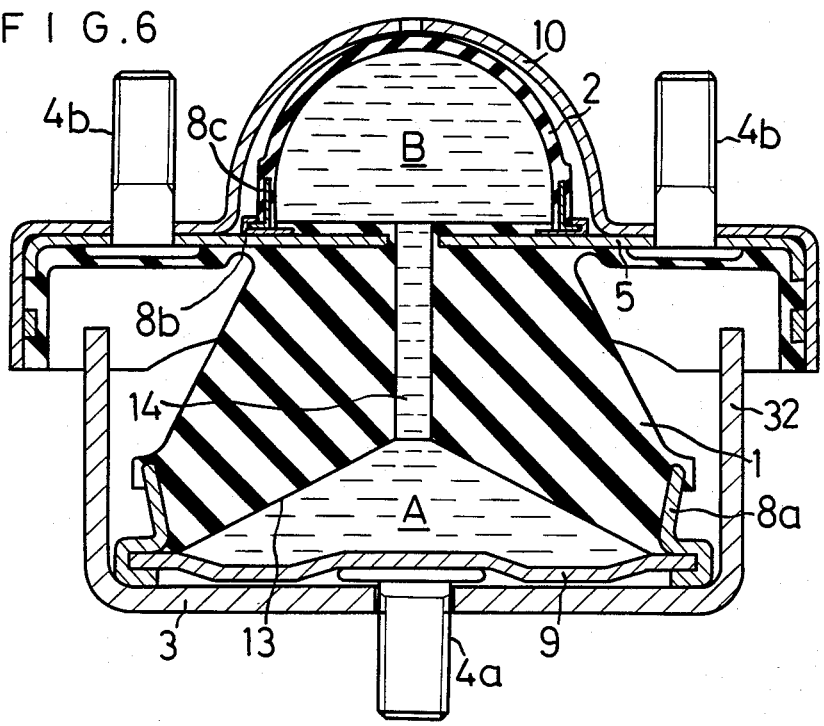
Figure 7:
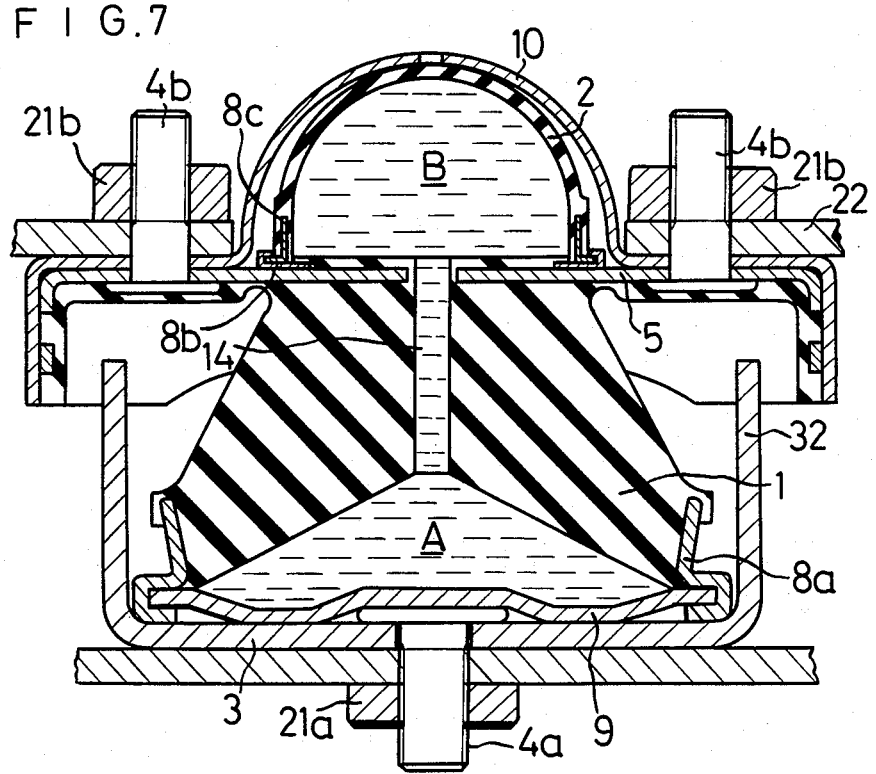

FIGS. 5 to 7 illustrate a fourth embodiment of the present invention.

The under surface of the wall 1 defines the conical cavity 13. To the outer periphery of the lower end of the wall 1, an annular caulking ring 8a is joined. Within the upper portion of the wall 1, the second supporting plate 5 is embedded along the upper surface thereof.

Both end portions of the supporting plate 5 are bent downwards in the vertical direction. The under surface of the supporting plate 5 is covered by rubber which is integrally formed with the wall 1.

The wall 1 is provided with the open passageway 14 which extends from the top end of the cavity 13 to the center of the upper surface of the wall 1.

To the central portion of the upper surface of the second supporting plate 5, an annular caulking ring 8b is welded.

The caulking ring 8a and the second supporting plate 5 provided with the caulking ring 8b are set in predetermined positions within the mould.

Then, rubber is poured into the mould for forming the wall 1, one part of which covers the upper surface of the central portion of the second supporting plate 5 and the under surface of the both end portions of the plate 5.

As a result, a united structure composed of the wall 1, the caulking ring 8a and the second supporting plate 5 is obtained.

The thin rubber elastic sheet 2 has a dome-shape. To the outer periphery of the lower end of the sheet 2, a reinforcing metallic ring 8c having a L-shaped section, is joined.

The above described united structure is immersed within a liquid bath. Within the liquid bath, the outer peripheral edge of the bottom plate 9 is fixed to the wall 1 by means of the caulking ring 8a, and the reinforcing ring 8c is fixed to the plate 5 by means of the caulking ring 8b.

As a result, an elastically damping device provided with the first and the second fluid chambers A and B which are filled with a liquid, can be obtained.

The damping device having the above described structure is disposed on the first supporting plate 3 having a U-shaped cross section as shown in FIG. 6, and a plurality of bolts 4a which are previously welded to the under surface of the bottom plate 9, are inserted into through holes provided in the supporting plate 3.

Since the caulking ring 8a is in contact with the upper surface of the supporting plate 3, the bottom plate 9 is positioned at a distance from the supporting plate 3.

Next, the damping device which is supported by the first supporting plate 3 is disposed on the body 20 of a vehicle and the bolts 4a are inserted into through holes formed in the body 20 as shown in FIG. 7.

The damping device is fixed to the body 20 by tightening the bolts 4a with nuts 21a from the reverse side of the body 20 until the bottom plate 9 is strongly pressed against the upper surface of the first supporting plate 3.

Then, the second supporting plate 5 is covered by the cover plate 10 provided with the dome-shaped projecting portion.

A plurality of bolts 4b which are previously welded to the second supporting plate 5, penetrate through holes formed in the plate 10.

On the plate 10, a bracket 22 is placed for supporting the engine of a vehicle and the engine is mounted on the bracket 22 by tightening the bolts 4b with nuts 21b from the upper side of the bracket 22.

According to this embodiment, the sealing portion of the first fluid chamber A, which is composed of the wall 1, the caulking ring 8a which is joined to the outer periphery of the lower end of the wall 1, and the outer peripheral portion of the bottom plate 9 which is caulked by the caulking ring 8a, can be strongly fixed and sealing effect of the above sealing portion can be improved.

In the conventional damping device, such a sealing portion moves upwards and downwards in accordance with the expansion and the contraction of the wall 1, and the change of the inner pressure of the first fluid chamber A. Therefore, in the conventional damping device, the joining of the caulking ring 8a and the bottom plate 9 is apt to loosen.

In contrast, according to this embodiment, when the nut 21a is screwed, the bottom plate 9 is pulled downwards and the caulking ring 8a joined to the outer peripheral portion of the bottom plate 9 is strongly pressed against the first supporting plate 3. Therefore, the sealing portion of the fluid chamber A is not floated from the first supporting plate 3 upwards and the caulked portion does not loosen. As a result, an excellent sealing characteristic can be maintained.

FIG. 8 illustrates a fifth embodiment of the present invention, especially illustrates the joining structure of the sheet 2 and the wall 1.

The other construction of the fifth embodiment is equal to that of the fourth embodiment.

Within the upper portion of the wall 1, the second supporting plate 5 is embedded. To the second supporting plate 5, the annular caulking ring 8b having a L-shaped cross section is welded around the passageway 14.

The rubber of the wall 1 extends upwards through the hole 41 and covers the upper surface of the second supporting plate 5 and the upper surface of the caulking ring 8b. A thick wall portion 17 is formed in the outer periphery of the wall 1 which covers the upper surface of the second supporting plate 5 and is in contact with the inner peripheral surface of the caulking ring 8b.

The opening end 23 of the dome-shaped thin walled rubber elastic sheet 2 is formed into a L-shaped cross section. And to the whole circumference of the opening end 22, the reinforcing ring 8c having a L-shaped cross section is joined. An upper end of the reinforcing ring 8c is embedded within the sheet 2 while the other end thereof projects outwards than the flange portion 24 formed in the outer periphery of the sheet 2.

The flange portion 24 is disposed on the wall 1 which covers the second supporting plate 5 so that the outer peripheral surface thereof is in contact with the inner peripheral surface of the thick wall portion 17 of the wall 1.

The reinforcing ring 8c is caulked by the caulking ring 8b. As a result, the second fluid chamber B is formed.

In the elastically damping device of this type, the thick wall 1 which defines the first fluid chamber A is generally made of natural rubber. The second fluid chamber B is located directly under the engine so that the thin sheet 2 which defines the second fluid chamber B is apt to be deteriorated due to heat of the engine. Therefore, the thin sheet 2 is generally made of chloroprene-rubber having an excellent heat resistance.

Since within the engine room, a large number of electric systems are installed, ozone is apt to be generated therewithin. Therefore, the wall defining the second fluid chamber B is required to have excellent weather resistance and ozone resistance. From the above reason, olefin rubber is suitable for the material of the thin sheet 2 rather than chloroprene-rubber.

However, olefin rubber is not easily vulcanized so that olefin rubber is not easily adhered to metal as compared with chloroprene-rubber.

Therefore, when the caulking metallic ring 8b is joined to the thin sheet 2 made of olefin rubber, the caulking ring 8b is apt to be peeled off from the sheet 2 so that the second fluid chamber B is not completely sealed by the cauling ring 8b.

By employing such a joining structure as shown in FIG. 8, the L-shaped end portion of the sheet 2 is joined to the end surface of the wall 1 and the thick walled portion 17 of the wall 1 is fixed to the reinforcing ring 8c.

Therefore, even if the reinforcing ring 8c is slightly peeled off from the sheet 2 made of olefin rubber, leakage of the liquid does not occur in the joining portion of the first and the second fluid chambers.

Figure 10:
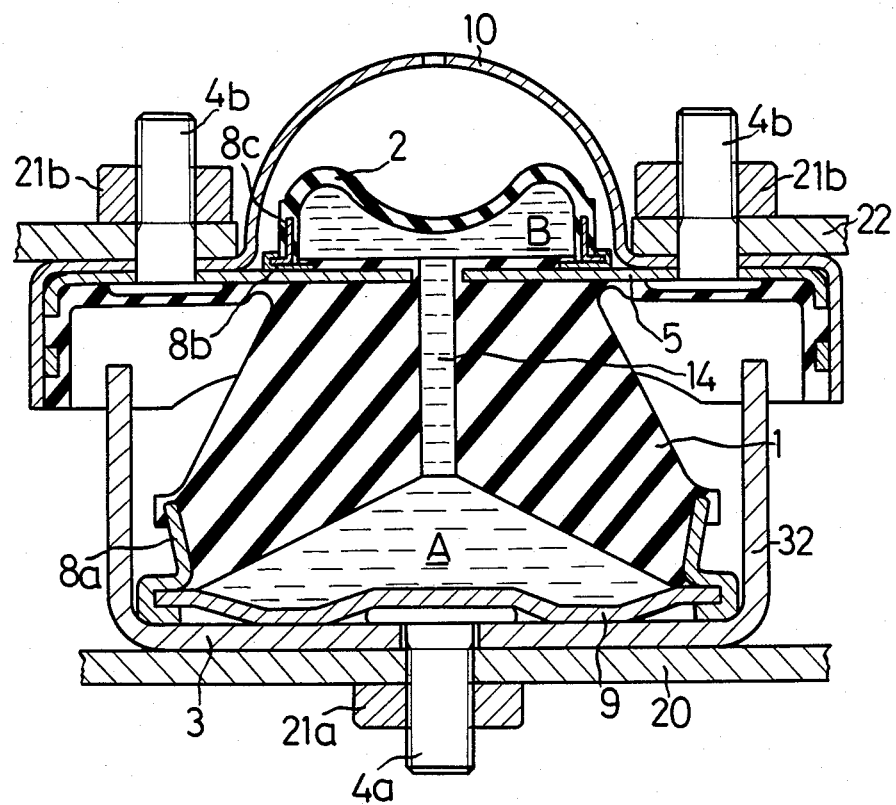

FIGS. 9 and 10 illustrate a sixth embodiment of the present invention.

In the sixth embodiment, the center of the sheet 2 is concaved downwards to decrease the volume of the second fluid chamber B. By forming the sheet 2 defining the second fluid chamber B into such a state, the durability of the sheet 2 can be improved.

Namely, the sheet 2 originally has a shape like a dome as shown by an alternate long the two short dashes line in FIG. 9.

Now, we assume that the sheet 2 has a shape like a dome and that the second fluid chamber B defined by the sheet 2 is completely filled with a liquid.

When the damping device having the above structure is mounted on the body of a vehicle and the engine is placed on the damping device, the wall 1 deforms due to the load of the engine. The volume of the first fluid chamber A decreases so that the liquid flows from the first fluid chamber A into the second fluid chamber B. As a result, the volume of the second fluid chamber B increases.

Therefore, a tension force is always applied to the sheet 2. When the engine vibrates, a larger tension force is applied to the sheet 2. Consequently, the sheet 2 is worn.

In the damping device of the sixth embodiment, the second fluid chamber B having a contracted volume is formed as shown in FIG. 9.

FIG. 10 illustrates the state wherein the damping device is mounted on the body 20 of a vehicle and the engine (not shown) is supported by the damping device.

When the engine vibrates, one part of the liquid moves from the first fluid chamber A to the second fluid chamber B so that the volume of the second fluid chamber B increases. But at this time, the sheet 2 is still concaved.

It is preferable to set the second fluid chamber B so that the sheet 2 is transformed into a dome shape when the vibration of which amplitude is the maximum is applied to the damping device.

Otherwise, the construction of the sixth embodiment is substantially equal to that of the fifth embodiment.

According to the sixth embodiment, no tension force is applied to the sheet 2, the durability of the sheet 2 is improved. And the excellent sealing property of the joining portion of the sheet 2 and the first fluid chamber A can be maintained.

As described above, since the open passageway interconnecting the first and the second fluid chambers is formed in the wall defining the first fluid chamber A, the construction of the device can be made simple.

And since the long open passageway 14 is formed between the first fluid chamber A and the second fluid chamber B, excellent vibration damping effect can be obtained and the damping effect increases in accordance with the increment of the amplitude of the vibration.

Furthermore, since the first fluid chamber is formed into a conical shape and the open passageway is formed from the top portion of the first fluid chamber in the vertical direction, the air intermixed with the fluid easily gathers into the second fluid chamber through the open passageway so that the air within the liquid scarcely lower the vibration damping effect of the device.

And according to the present invention, excellent sealing effect for the liquid filling the fluid chambers and excellent durability of the device can be obtained.

Having now fully described the invention, it will be apparent to one of ordinary skill in the art that many changes and modifications can be made thereto without departing from the spirit or scope of the invention as set forth herein.

What is claimed is:

1. An elastically damping device for the suspension of an engine comprising:
    an elastically yielding block having an upper surface and an under surface which is in parallel with said upper surface;
    a first supporting plate for supporting said block on a body of a vehicle, which is connected to said under surface of said block;
    a second supporting plate for mounting said engine on said block, which is connected to said upper surface of said block;
    said block being provided with a conical cavity which is formed in the bottom portion thereof so as to open in said under surface, and a passageway which is formed from the top portion of said cavity to said upper surface of said block in the vertical direction;
    the diameter of said passageway being changeable as said block yields upon receiving engine vibration of large amplitude;
    a bottom plate which is fixed to said under surface of said block and covers said cavity to form a first fluid chamber;
    an elastically yieldable sheet member of which peripheral end is fixed to said upper surface of said block around the opening of said passageway to form a second fluid chamber;
    said first fluid chamber, said second fluid chamber and said passageway being filled with a liquid.

2. An elastically damping device according to claim 1, wherein:
    the thickness of said block in the lateral direction increases from said under surface of said block to said upper surface thereof.

3. An elastically damping device according to claim 2, wherein:
    said block has a frustoconical shape; and
    said under surface has a diameter larger than that of said upper surface.

4. An elastically damping device according to claim 1, further comprising:
    a first stopper means for restricting the deformation of said block which forms said first fluid chamber, in the upward and downward directions;

said first stopper means being composed of at least one extending portion which extends from the outer periphery of said second supporting plate in the lateral direction; and at least one projecting portion which projects from the outer periphery of said first supporting plate upwards so that the projecting end of said projecting portion is opposed to said extending portion at a predetermined distance.

5. An elastically damping device according to claim 4, further comprising:

a second stopper means for restricting the deformation of said sheet member which forms said second chamber;

said second stopper means being composed of a cover plate which is provided with at least one vent hole and which is fixed to said upper surface of said block so as to cover said sheet member at a predetermined distance.

6. An elastically damping device according to claim 1, wherein:

said second supporting plate is fixed to said upper surface of said block; and the peripheral end of said sheet member is airtightly connected to said second supporting plate by a caulking ring which is secured to said second supporting plate.

7. An elastically damping device according to claim 1 wherein:

said second supporting plate is embedded integrally within the upper portion of said block along said upper surface thereof; and the peripheral end of said sheet member is connected in an airtight manner to said upper surface of said block.

8. An elastically damping device according to claim 1, wherein:

said sheet member is in a loose state so that said sheet member is transformed into a dome shape when the maximum vibration is applied to said damping device; and said second fluid chamber is completely filled with a liquid.

9. An elastically damping device according to claim 1, wherein:

said block is made of natural rubber.

10. An elastically damping device according to claim 9, wherein:

said sheet member is made of natural rubber, chloroprene-rubber or olefin rubber.

* * * * *